W. P. COWLES.

REINFORCED CONCRETE STRUCTURE.

APPLICATION FILED DEC. 17, 1910.

Reissued July 31, 1917.

14,336.

2 SHEETS—SHEET 1.

Witnesses
Milton Lenoir
E. M. Hatcher

Inventor
W. P. Cowles
By Gillson & Gillson
Attorneys.

W. P. COWLES.

REINFORCED CONCRETE STRUCTURE.

APPLICATION FILED DEC. 17, 1910.

14,336.

2 SHEETS—SHEET 2.

Reissued July 31, 1917.

Witnesses.
Milton Lenoir
E. M. Klatcher

Inventor
W. P. Cowles
By Gillson & Gillson
Attorneys.

UNITED STATES PATENT OFFICE.

WILLIAM PIERCE COWLES, OF MINNEAPOLIS, MINNESOTA, ASSIGNOR OF SIX-TENTHS TO JOHN WUNDER, OF MINNEAPOLIS, MINNESOTA.

REINFORCED CONCRETE STRUCTURE.

14,336. Specification of Reissued Letters Patent. Reissued July 31, 1917.

Original No. 969,039, dated August 30, 1910, Serial No. 484,708, filed March 20, 1909. Application for reissue filed December 17, 1910. Serial No. 597,948.

*To all whom it may concern:*

Be it known that I, WILLIAM PIERCE COWLES, a citizen of the United States, residing at Minneapolis, in the county of Hennepin and State of Minnesota, have invented certain new and useful Improvements in Reinforced Concrete Structures; and I do hereby declare the following to be a full, clear, and exact description of the invention, such as will enable others skilled in the art to which it appertains to make and use the same.

My invention relates to reinforced concrete structures, and has for its object the doing away with the well known T beams now in use and the substitution therefor of slabs integral with the supporting columns, thereby producing a much cheaper structure but at the same time preserving the strength and resisting powers to strain that accompanied the said beam structures.

To these ends the invention consists in the novel combinations of parts and details of construction more fully hereinafter disclosed and particularly pointed out in the claims.

Referring to the accompanying drawings forming a part of this specification in which like numerals refer to like parts in all the views:—

Figure 1 is an elevational view partly in section of integral columns and slabs;

Fig. 2, a diagrammatic plan view of the reinforcing rods crossing each other at a column;

Figure 8:
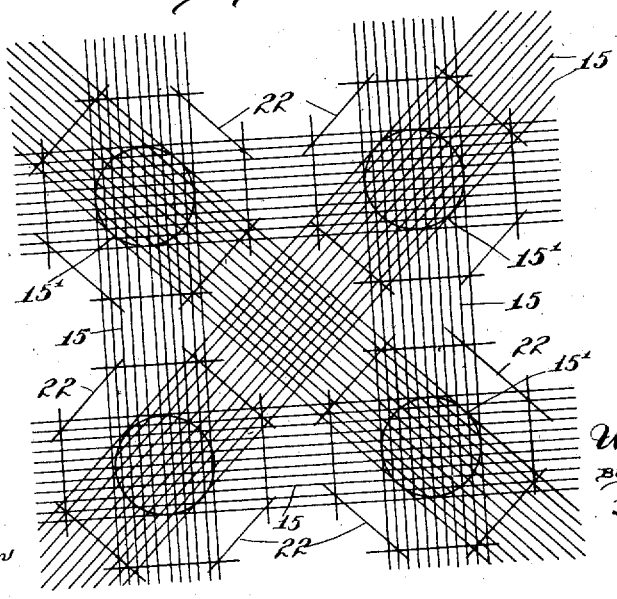
Figure 7:
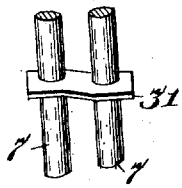

Fig. 7, a detail of a modified means of temporarily holding said rods together, and Fig. 8, is a diagrammatic view of the reinforcing rods or wires in a single slab when supported by a plurality of columns.

Figure 1:
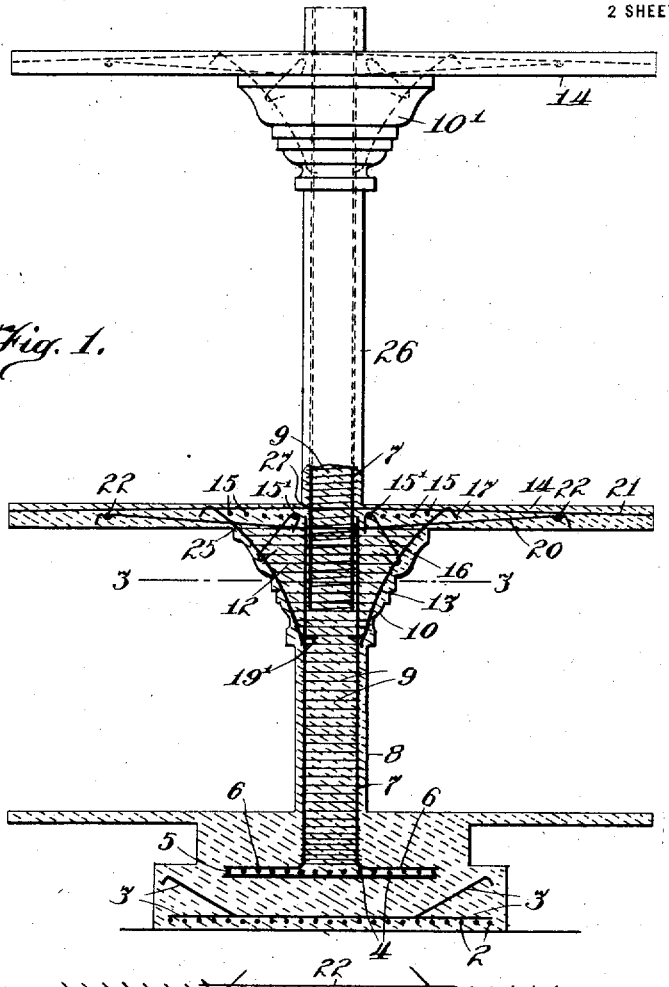
Figure 2:
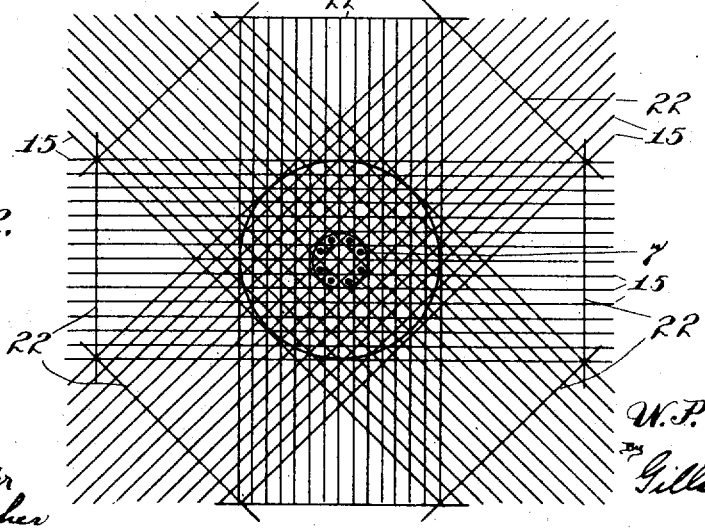
Figure 3:
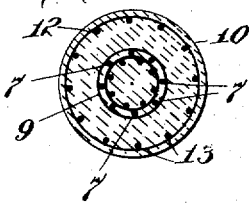
Fig. 3, is a sectional view on the line 3—3 of Fig. 1.
Figure 4:
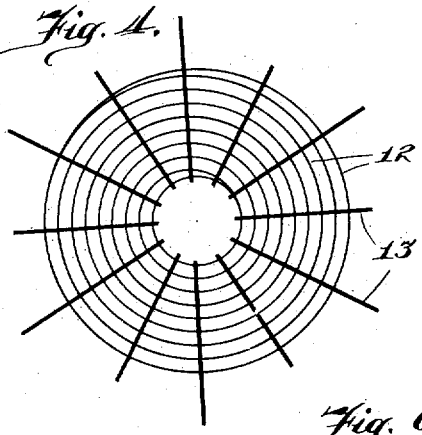
Fig. 4, is a detail plan view of the basket removed.
Figure 5:
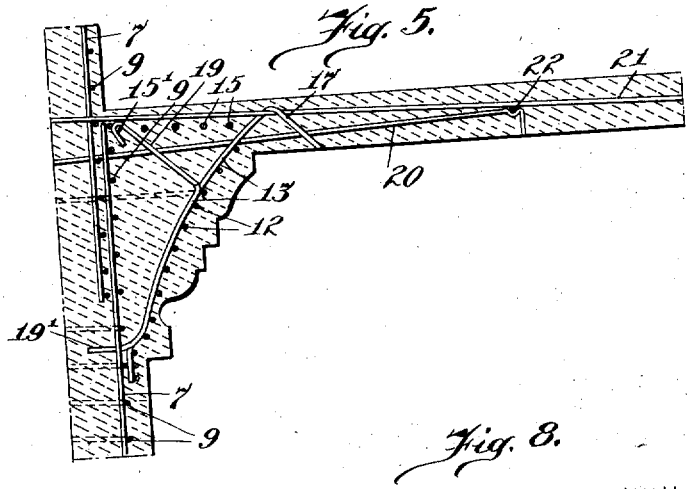
Fig. 5, is an enlarged sectional view showing a slight modification in the means of anchoring the basket.

1 indicates any suitable base in which is embedded a plurality of rods 2, crossed by other rods 3, above which is a second set of crossed rods 4 and 5 suitably anchored in the material. Above this second set of reinforcing material radially branch out the extremities 6 of the longitudinally reinforcing rods 7 of the columns 8 to form feet, as shown. These longitudinal rods 7 are tied together by any suitable means, preferably by the spirally wound wire or rod 9, and the column 8 is enlarged near its upper end to form the capital 10 hereinafter called a mushroom. In this mushroom shaped capital 10 is suitably anchored a basket 11, best shown in Figs. 1 and 4, which may be provided with any suitable structure, but is preferably provided with a body part comprising the spiral windings 12, and the longitudinally radiating rods 13 provided with anchoring pieces, as illustrated. At or near the top of each column and integral therewith and with the mushroom or capital 10, is a slab 14 extending in all directions; and securely imbedded in these slabs 14 are the series of crossed reinforcing rods or wires 15 diagrammatically illustrated in Figs. 2 and 8. The basket is preferably secured to this series of rods by means of the hooks or links 16 passing between said rods and the walls of said basket. Or the basket may be securely anchored in the concrete by simply bending sharply over the ends 17 of its radially disposed longitudinal rods 13, as best shown in Figs. 1 and 5; or the links 16 may be dispensed with, and the ends 19 and 19′ of each alternate rod 13 may be respectively bent over a hoop 15 and into the column 8, as illustrated in Fig. 5. In addition to the reinforcing rods 15, there is provided the compression rods 20 and the tension rods 21, or certain of the rods 15 may, if desired, be disposed as compression and tension rods respectively. The compression rods are preferably suitably attached to a ring 22, which itself, if desired, may be constructed of individual rods, suitably joined together, as illustrated in Figs. 2 and 8.

Considering only one floor supported by the column 8, from the structure so far disclosed it will be observed that no T beams are required, nor are any centering pieces or fillings between said beams and the column required. It will be further seen that any strains that may come on the slab 14 will be resisted by the compression rods 20, and the tension rods 21 in the manner well known to engineers, to say nothing of the inherent strength of the composite structure due to the peculiar disposition of its reinforcing materials. For example, should the slab 14 have a tendency to break at the point 25 where it joins the capital or mushroom 10, it is apparent that not only will the tension and compression rods do their part in preventing a rupture, but also the ends 17 of the longitudinal rods 13 of the basket which are preferably extended beyond said point, and almost to the upper surface of the slab, will greatly aid in averting such a disaster. This strengthening action may be further increased by peculiar anchoring of the ends 19 and 19′ of said longitudinal rods 13, as well as by the links 16 hooking over the hoop 15′, as will be readily understood.

Considering now other floors above the first slab 14, a column 26 integral with the column 8, mushroom 10′ and slab 14 is provided, which also has longitudinal reinforcing rods 7 tied together by suitable bindings 9. In structures of this nature the tendency is for a column such as 26 to break off at the point 27 where it joins the slab 14, and to avoid this tendency. I telescope the upper set of rods 7 into the lower set and extend the binding material 9 of the upper set into the telescoping sections, as shown. This feature carries the anchorage and the weight imposed by said column 26 well into the column 8, and into what is really the strongest portion of said column 8, because opposite or near the telescoping sections are located the reinforcing material of the basket, the rods 15, and the tension and compression rods, and each will play their parts in resisting any tendency of the column 26 to rupture at the point 27.

Figure 6:
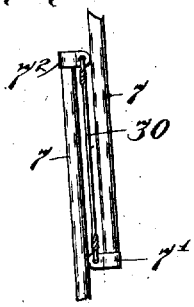
Fig. 6, is a detail showing one way of temporarily holding together the longitudinal reinforcing rods of the columns.

In fitting the two sets of rods together preparatory to pouring the concrete material, in order to temporarily hold the same in place, it is convenient to connect the ends 7′ of the upper rods 7 with the ends $7^2$ of the lower rods 7 by means of wires 30, as illustrated in Fig. 6. Or the two sets of rods 7 may be held together by means of a clip 31, as illustrated in Fig. 7.

In Fig. 1, the dotted lines show the upper set of rods 7 to be continuous and not to telescope at the second mushroom 10′, and this structure in some cases will be found to be desirable.

It is evident that as many columns 8 as desired may be employed, four being indicated in Fig. 8. Likewise, as many columns 26 above the columns 8 may be employed as the structure demands. But in all cases the whole forms a single integral reinforced concrete structure provided with mushrooms at the tops of the columns, and with the reinforcing material so disposed at each point as to resist the strains most liable to occur at the point in question.

By omitting the T beams usually employed a saving in concrete material is effected, and by omitting the centerings and fittings usually employed around the heads of the columns a further saving in the cost of such material is effected.

It is obvious that those skilled in the art may vary the construction and disposition of the parts without departing from the spirit of this invention, and therefore I do not wish to be limited to the exact details shown, except as may be required by the claims.

What I claim is:

1. In a concrete structure the combination of a column; a slab integral therewith; a series of crossed reinforcing rods 15 embedded in said slab; a tension member 21 embedded in said slab; a compression member 20 also embedded in said slab; a capital or mushroom integral with said column and slab; a basket, comprising longitudinally radiating rods and windings embedded in said capital or mushroom; a ring 15′; and a connection between said basket and said ring, substantially as described.

2. In a reinforced concrete structure, the combination of a plurality of integral columns in longitudinal alinement, each provided with a set of reinforcing rods, the set of rods in the one column telescoping into the set of rods in the other; connections between the telescoping portions of said rods; a reinforced capital or mushroom surrounding the telescoping parts of said rods; and a reinforced slab integral with said column and capital or mushroom, substantially as described.

3. In a reinforced concrete structure the combination of a column provided with a capital integral therewith; and a slab integral with said capital, the latter being reinforced by a basket having the longitudinally radiating rods 13 provided with the bent ends 19 and 19′ each securely anchored in the concrete material, substantially as described.

4. In a reinforced concrete structure, the combination of a plurality of integral columns, in longitudinal alinement, each provided with a set of reinforcing rods, the set in one column telescoping into the set in an adjacent column; a reinforced mushroom surrounding the telescoping parts of said rods; a reinforced slab integral with said columns and mushroom; and material 9 spirally wound around said telescoping rods, substantially as described.

5. In a reinforced concrete structure, the combination of a plurality of integral columns, in longitudinal alinement, each provided with a set of reinforcing rods, parts of said sets telescoping into each other; a mushroom surrounding the telescoping parts of said sets of rods; said mushroom being provided with a reinforcing basket having the longitudinal rods 13 anchored in the concrete material; a reinforced slab integral with said columns and mushroom; and spirally wound wire 9 surrounding said telescoping rods, substantially as described.

6. A reinforced concrete structure comprising a column, a flat floor slab resting thereon, a plurality of tension reinforcing rods radially disposed about the column in the upper area of the floor slab adjacent the column and extending outwardly and downwardly beyond the column, a plurality of compression reinforcing rods radially disposed about the column in the lower area of the floor slab adjacent the column and extending outwardly and upwardly beyond the outer face of the column, a capital formed integral with the column and floor slab, and a plurality of reinforcing rods radially disposed in the capital about the axis of the column and having their lower ends embedded in the concrete column and their upper ends embedded in the concrete slab.

7. In a reinforced concrete structure, the combination of a plurality of integral columns in longitudinal alinement, each provided with a set of reinforcing rods, a capital formed integrally with the top of said column, and with the bottom of said slab, said capital being provided with a reinforcing basket comprising the longitudinal rods 13 anchored in the concrete material, and spirally wound rods surrounding said rods, and embedded in said capital.

WILLIAM PIERCE COWLES.

Witnesses:

G. E. Sorensen,

C. H. Rehfuss.

Copies of this patent may be obtained for five cents each, by addressing the "Commissioner of Patents, Washington, D. C."